Oct. 22, 1940.  R. W. SCOTT  2,218,726
DRIVE MECHANISM
Filed Jan. 3, 1933  3 Sheets-Sheet 1

FIG. I

INVENTOR.
RAY W. SCOTT
BY McConkey Dawson & Booth
ATTORNEYS.

Oct. 22, 1940.　　　R. W. SCOTT　　　2,218,726
DRIVE MECHANISM
Filed Jan. 3, 1938　　　3 Sheets-Sheet 2

INVENTOR.
RAY W. SCOTT
BY McConkey Dawson & Booth
ATTORNEYS.

Oct. 22, 1940.                R. W. SCOTT                2,218,726
                            DRIVE MECHANISM
                        Filed Jan. 3, 1938         3 Sheets-Sheet 3
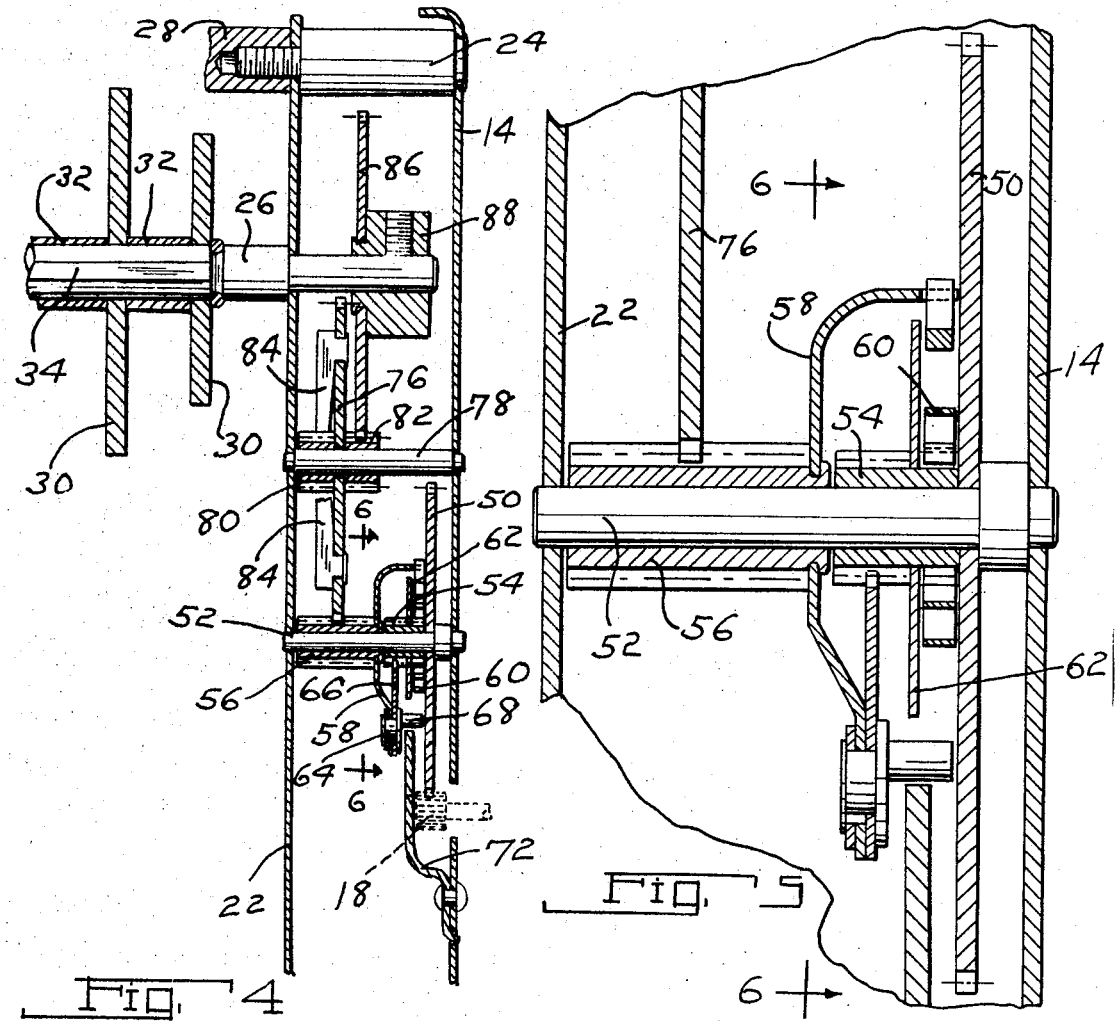
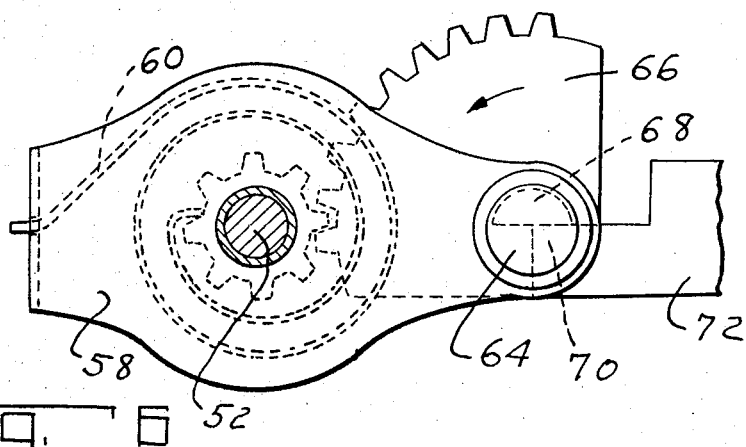
INVENTOR.
RAY W. SCOTT
BY
McConkey Dawson & Booth
ATTORNEYS.

Patented Oct. 22, 1940

2,218,726

UNITED STATES PATENT OFFICE 2,218,726

DRIVE MECHANISM

Ray W. Scott, Detroit, Mich., assignor to Bendix Home Appliances, Inc., Detroit, Mich., a corporation of Delaware Application January 3, 1938, Serial No. 183,026

13 Claims. (Cl. 74—112)

This invention relates to mechanism including parts operated periodically by continuously operating driving means, in the nature of an escapement mechanism, and is illustrated as embodied in the master control switch of an automatic washing machine.

An object of the invention is to provide a compact and smoothly operating mechanism which will require little power for operation, so that it can be driven by a small electric clock motor or the like.

Another object is to provide mechanism of this character in which the gears are always in mesh, in spite of the fact that part of the gears run continuously and part of them intermittently.

An important feature relates to arranging the mechanism in a compact manner in the housing of a washing machine switch or the like, and to providing a one-way device arranged to permit the switch to be set forward manually when desired without interfering with the intermittent drive or escapement.

These and other objects and features of the invention, including various novel combinations and desirable particular constructions, will be apparent from the following description of the illustrative embodiment shown in the accompanying drawings, in which:

Figure 1 is a horizontal section through the switch, just below the top of the housing, showing the novel drive mechanism in plan;

Figures 2 and 3 are sections there-through on the lines 2—2 and 3—3 of Figure 1;

Figure 4 is a partial section on the line 4—4 of Figure 2, except that one of the gears is turned 90° to show the spring pawls carried thereby;

Figure 5 is an enlarged partial section showing that part of Figure 4 which includes the drive spring; and Figure 6 is an enlarged section on the line 6—6 of Figure 4, showing a stop device which cooperates with a segmental gear to time the periodic operation of the escapement.

Figure 1:
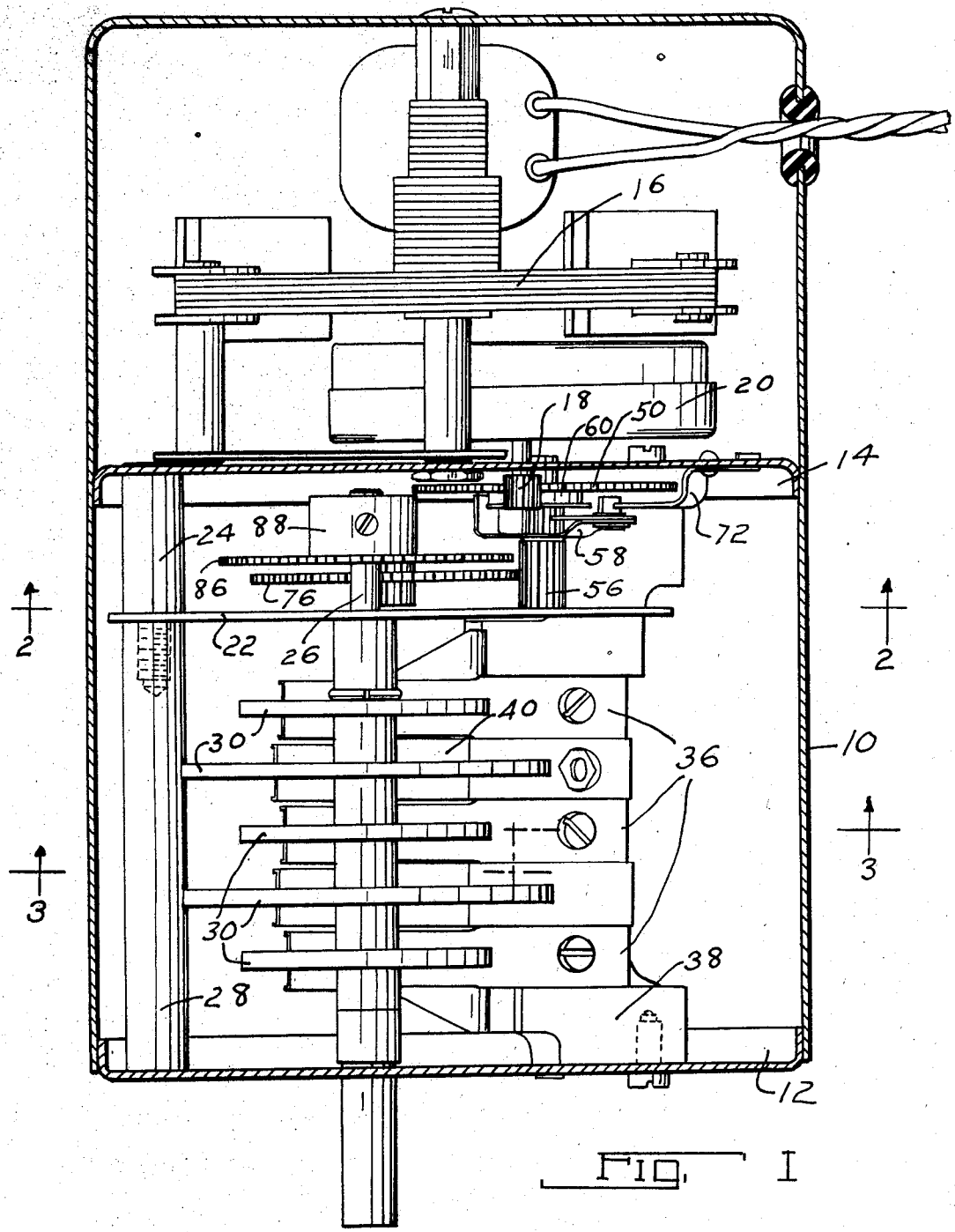

The particular switch illustrated is intended to control an automatic washing machine as fully described in application No. 129,429, filed March 6, 1937, by Rex Earl Bassett, Jr., and John W. Chamberlin, but the mechanism embodying the invention is capable of various other uses than driving this particular switch.

The switch is illustrated as including a cup-shaped housing 10, the open end of which is closed by a flanged disk 12 frictionally pressed in place, and which has a similar disk 14 pressed far enough down to form an intermediate partition. The disks 12 and 14 form part of the switch assembly described below, and the housing 10 is pushed over this assembly as shown, to provide complete protection for the mechanism.

A small constant-speed electric clock motor 16, of any desired type, is mounted between the disk 14 and the end of the housing 10, this motor being arranged to drive continuously a drive pinion 18 through a suitable reduction-gear unit 20.

The pinion 18 operates mechanism, described below, arranged between the disk 14 and a plate 22 secured thereto by posts 24, intermittently to drive a cam-shaft 26 journaled in the plate 22 and the end disk 12, which are rigidly secured together by posts 28.

Figure 3:
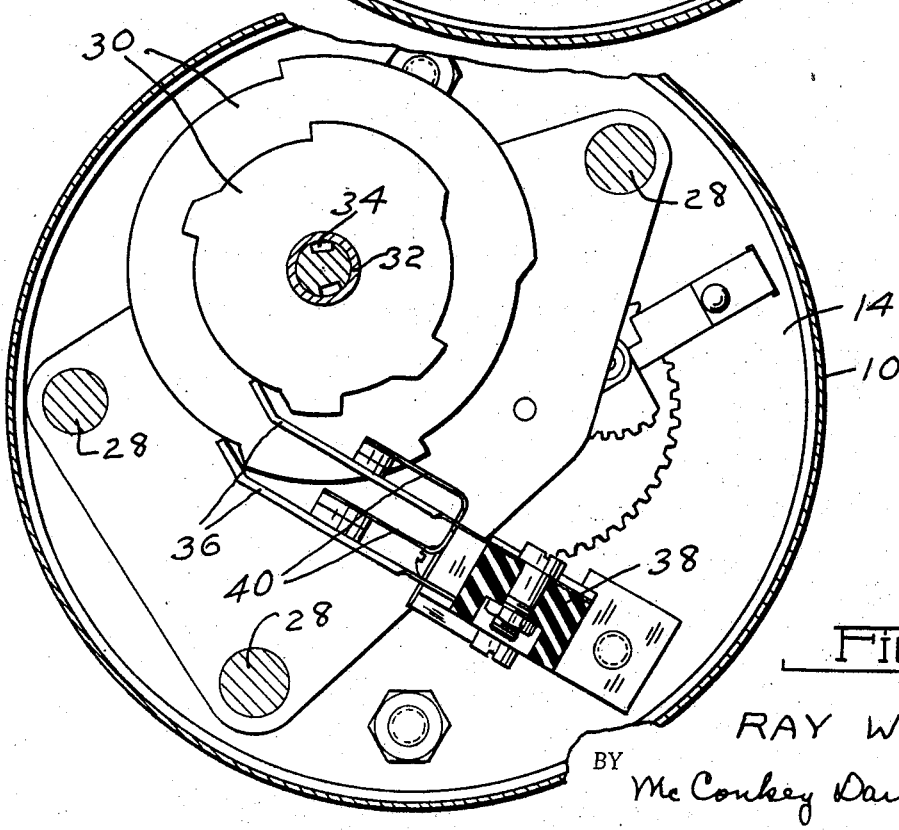

The cam-shaft 26, as shown in Figures 1, 3, and 4, has mounted thereon a series of edge cams 30 of insulating material, separated by spacers 32, and keyed to the shaft 26 by lugs projecting into grooves 34 in the shaft. Cams 30 are alternately large and small in diameter, and control spring contacts 36 alternately secured to opposite sides of a bar 38 of insulating material, thus providing a compact assembly. Contacts 36 are urged yielding toward stationary contacts 40, thus closing the various circuits unless the contacts are separated by the cams 30. The bar 38 is supported between disks 12 and 14.

In the arrangement shown, the contacts 40 are all stamped from a single plate which is secured to the edge of the insulating bar 38, the plate having openings therethrough with adequate clearance for the contacts 36.

The most important features of the invention relate to the drive or escapement mechanism, shown arranged between the disk 14 and the plate 22, and which drives the cams 30 or other suitable device intermittently from a continuously-operating source of power such as the pinion 18, preferably in a manner permitting the switch to be advanced or set forward manually when desired.

In the arrangement illustrated, the shaft 26 with cams 30 is turned one revolution for each cycle of the washing machine, and unless manually set forward to shorten the washing step of the cycle it may require 45 minutes to an hour for one complete cycle. Thus a long time is required for a single revolution of the camshaft, yet contacts 36—40 are opened and closed rapidly during the periodic movements of that shaft.

Figure 2:
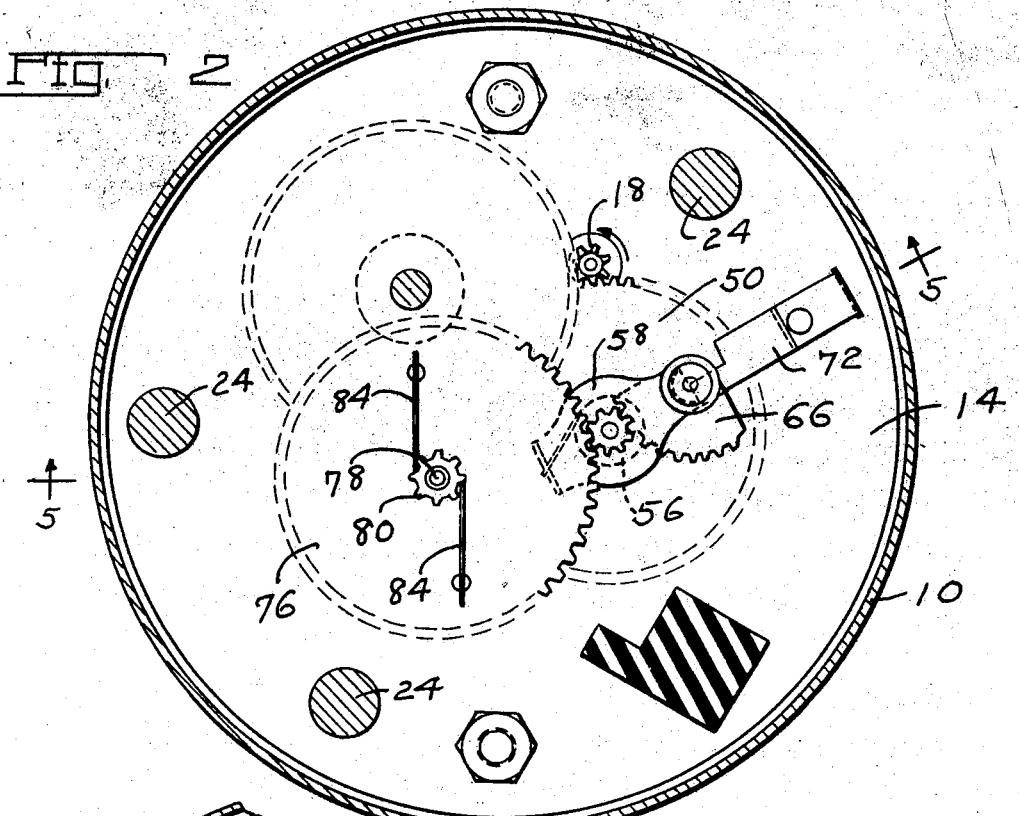

The pinion 18 is shown (90° out of place in Figure 4 but in its correct position in Figure 2) as driving a large gear 50 pressed on a shaft 52 to drive that shaft. The shaft 52 also has a small pinion 54 pressed frictionally in place thereon beside the gear 50. Loosely sleeved on the shaft 52 beside the pinion 54 is a pinion 56, to one end of which is rigidly riveted a carrier such as a stamping 58.

The carrier 58 at one end has attached thereto the outer end of a spiral clock spring 60 which surrounds the pinion 54, and the inner end of which interlocks with one of the teeth of pinion 54 as shown in Figure 6. A washer 62 may be pressed onto the pinion 54 to hold the spring 60 laterally.

The other end of the carrier 58 carries a shaft 64 rigid with a quadrant or segmental gear 66 meshing with the pinion 54. One end of the shaft 64 is flattened across a diameter of the shaft to form an eccentric movable stop 68. The stop 68 is engageable with a fixed stop such as a lug 70 formed on a bracket 72 carried by disk 14 (Figures 4 and 6).

The eccentric stop 68 engages the lug 70 in the position of Figure 6, then the segmental gear 66 is driven by pinion 54 to turn the stop 68 through 90°, at the same time tensioning the spring 60, whereupon the stop 68 slips off the lug. Spring 60 then turns the carrier 58 through one revolution, during which time the segmental gear 66 rolls on the pinion 54 back to its initial position so that the flat side of stop 68 re-engages the lug 70 at the end of the revolution.

This operation turns the pinion 56 through one revolution. This pinion meshes with and drives a gear 76 rotatably journaled on a shaft 78 between two pinions 80 and 82 pressed non-rotatably thereon. The gear 76 carries two resilient pawls 84, shown as stampings having lugs seated in slots in the gear. These pawls engage the pinion 80, which serves as a rack thus forming a one-way drive connection, so that the gear 76 will drive the shaft 78 when turned by pinion 56 as described above, although shaft 78 can be advanced manually when desired without turning the gear 76 or the pinion 56.

The pinion 82 of course turns with the shaft 78 and pinion 80, and meshes with and drives a large gear 86 riveted to a hub 88 secured on the cam-shaft 26 by a set-screw or the equivalent.

When assembled in the washing machine as described in the above-identified Bassett and Chamberlin application, the lower end of the camshaft 26 in Figure 1 is provided with an indicator (not shown herein) which traverses a suitable dial or scale, and which can be grasped by the operator to advance the camshaft 26 manually, as permitted by the one-way drive 80—84.

In operation, the clock mechanism drives continuously at a constant speed all of the parts from the clock up to and including the pinion 54. The pinion 54 drives the segmental gear 66, at the same time tensioning the spring 60, until the eccentric stop 68 trips and slides off the stationary stop 70, whereupon the spring 60 drives the pinion 56 through one revolution. Normally I prefer to time the parts so this occurs once each minute, so that pinion 56 may be regarded as driven intermittently at an average speed of one revolution per minute.

This slowly advances the camshaft 26, which is intended to turn through one revolution for each cycle of the machine controlled by the switch. If the washing step of the cycle, for example, is to be shortened in any particular case, this is readily accomplished by advancing the camshaft 26 manually, as permitted by the one-way drive 80—84. At the end of one revolution of shaft 26, one of the cams 30 opens the circuit of the clock motor 16, stopping the drive until the camshaft is advanced manually to close this motor circuit again to start the next cycle.

While one embodiment has been described in detail, it is not my intention to limit the scope of the invention to that particular embodiment, or otherwise than by the terms of the appended claims.

I claim:

1. Drive mechanism comprising a pivotally supported carrier connected to a gear and having mounted thereon at one side of its axis a segmental gear connected to an eccentric stop device which is turned by angular movement of the segmental gear, a continuously driven gear meshing with and driving at times said segmental gear, a drive spring for said carrier tensioned by said driven gear during angular movement of the segmental gear, a stationary stop holding the carrier by engagement with the eccentric stop while the segmental gear is being driven, the segmental gear being arranged to turn the eccentric stop out of engagement with the stationary stop at the end of the segmental gear movement to permit the carrier to turn one revolution and the eccentric stop being turned during such revolution back into position to re-engage the stationary stop at the end of said revolution, and driving means driven by said first gear during the revolution of the carrier and which includes a one-way drive device permitting the driving means to be turned forward when the carrier is stationary.

2. Drive mechanism comprising a pivotally supported carrier having mounted thereon at one side of its axis a segmental gear connected to an eccentric stop device which is turned by angular movement of the segmental gear, means driven by rotational movement of said carrier, a continuously driven gear meshing with and driving at times said segmental gear, a drive spring for said carrier tensioned by said driven gear during angular movement of the segmental gear, and a stationary stop holding the carrier by engagement with the eccentric stop while the segmental gear is being driven, the segmental gear being arranged to turn the eccentric stop out of engagement with the stationary stop at the end of the segmental gear movement to permit the carrier to turn one revolution and the eccentric stop being turned during such revolution back into position to re-engage the stationary stop at the end of said revolution.

3. Drive mechanism comprising a pivotally supported carrier connected to a gear and having mounted thereon at one side of its axis a segmental gear connected to an eccentric stop device which is turned by angular movement of the segmental gear, a continuously driven gear meshing with and driving at times said segmental gear, a drive spring for said carrier tensioned by said driven gear during angular movement of the segmental gear, a stationary stop holding the carrier by engagement with the eccentric stop while the segmental gear is being driven, the segmental gear being arranged to turn the eccentric stop out of engagement with the stationary stop at the end of the segmental gear movement to permit the carrier to turn one revolution and the eccentric stop being turned during such revolution back into position to re-engage the stationary stop at the end of said revolution, and driving means driven by said first gear during the revolution of the carrier.

4. A device of the class described comprising driving mechanism, a rotary member connected to drive said mechanism and carrying at one side of its axis an eccentric stop member movable about its own axis, a drive spring for turning said rotary member, means for turning said stop member and simultaneously tensioning said spring, and a stationary stop engaged by the eccentrically movable stop when it is in one position to hold said rotary member and which is cleared by the eccentrically movable stop in another position to permit the spring to turn the rotary member, the eccentrically movable stop being turned by said turning means back to said one position during rotation of the rotary member.

5. A device of the class described comprising driving mechanism including a rotary member, a stop eccentrically mounted on said member for movement thereon about its own axis, a stationary stop engaged by said first stop when in one position and cleared thereby when in another position to release said rotary member, a spring arranged to rotate said member when so released, and continuously driven means for turning the first stop from said one position to said other position and simultaneously to tension said spring, said continuously driven means being constructed and arranged to turn said first stop back to said one position during rotation of said member.

6. A device of the class described comprising driving mechanism including a rotary member, a stop eccentrically mounted on said member for movement thereon about its own axis, a stationary stop engaged by said first stop when in one position and cleared thereby when in another position to release said rotary member, a spring arranged to rotate said member when so released, and continuously driven means for turning the first stop from said one position to said other position and simultaneously to tension said spring, said spring being a spiral spring anchored at its outer end to the rotary member, and said last means including a continuously driven part at the center of the spring and anchored to the inner end of said spring, said continuously driven means being constructed and arranged to turn said first stop back to said one position during rotation of said member.

7. A device of the class described comprising a shaft, driving mechanism including a member rotatably mounted on said shaft, a pinion fixed on the shaft, a spiral spring anchored at its outer end to said member and anchored at its inner end to the shaft and pinion, a segmental gear meshing with said pinion and pivoted on the rotatable member some distance from said shaft, a part connected to be turned by the segmental gear and having rigid therewith a stop which is eccentric with respect to its axis of movement, and a stationary stop engaged by the eccentric stop in its position when the segmental gear is at the beginning of a stroke and cleared by the eccentric stop at the end of the stroke of the segmental gear to permit the spring to turn said member on the shaft.

8. A device of the class described comprising a shaft, driving mechanism including a member rotatably mounted on said shaft, a pinion fixed on the shaft, a spiral spring anchored at its outer end to said member and anchored at its inner end to the shaft and pinion, a segmental gear meshing with said pinion and having a shaft carried by the rotatable member some distance from said first shaft, the end of the second shaft being cut away at one side to form a stop which is eccentric with respect to the axis of movement of the second shaft, and a stationary stop engaged by the eccentric stop in its position when the second shaft is in one angular position and cleared by the eccentric stop in a position 90° further around to permit the spring to turn said member on the sahft through one revolution.

9. A device of the class described comprising continuously-operating driving means, a rotatable driven member, a spring drivably connected to said driven member, a rotatable member driven by the driving means and carrying a stop turned as said rotatable member is driven from one position where it holds the driven member while the spring is tensioned to another position in which it releases the driven member to be turned by said spring, means operated by the driving means for tensioning the spring, and a stationary part engaged by the stop when in said one position and cleared by the stop when in said other position.

10. A rotary-motion translating-device, including in combination, a substantially-constantly-rotating driving-member, an intermittently-rotating driven-member, resilient coupling-means operatively interconnecting the said driving-member with the said driven-member for effecting the movement of the latter by the former, a stop-abutment; a rotary latch-member releasably engageable with the said stop-abutment, and latch-releasing means operatively connected with both the said driving-member and the said rotary latch-member for turning the latter out of engagement with the said stop-abutment to release the said driven-member for rapid movement by the said resilient coupling-means.

11. A rotary-motion translating-device, including in combination, a substantially-constantly-rotating driving-member, an intermittently-rotating driven-member, a spiral energy-storing coupling-spring operatively interconnecting the said driving-member with the said driven-member for moving the latter, a stop-abutment, a rotary latch-member releasably engageable with the said stop-abutment, and latch-releasing means operatively connected with both the said driving-member and the said rotary latch-member for turning the latter out of engagement with the said stop-abutment to release the said driven-member for rapid movement by the said spiral energy-storing coupling-spring.

12. A rotary-motion translating-device, including in combination, a substantially-constantly-rotating driving-train including a toothed member, an intermittently-rotating driven-member, resilient coupling-means operatively interconnecting the said driving-train with the said driven-member for effecting the movement of the latter by the said driving-train, a stop-abutment, a toothed sector pivotally carried by the said intermittently-rotating driven-member and engaged with the teeth of the toothed member of the said driving-train, and a latch-member carried by the said driven-member and operatively connected to the said toothed sector for being moved thereby out of engagement with the said stop-abutment to release the said driven-member for rapid movement by the said resilient coupling-means.

13. A rotary-motion translating-device, including in combination, a substantially-constantly-rotating driving-train including a toothed member, an intermittently-rotating driven-member, resilient coupling-means operatively interconnecting the said driving-train with the said driven-member for effecting the movement of the latter by the former, a stop-abutment, a toothed sector pivotally carried by the said intermittently-rotating driven-member and engaged with the teeth of the toothed member of the said driving-train, and a latch-member carried by the said driven-member and operatively connected to the said toothed sector for being moved thereby out of engagement with the said stop-abutment to release the said driven-member for rapid movement by the said resilient coupling-means.

RAY W. SCOTT.

CERTIFICATE OF CORRECTION.

Patent No. 2,218,726.                                        October 22, 1940.

RAY W. SCOTT.

It is hereby certified that error appears in the printed specification of the above numbered patent requiring correction as follows: Page 3, second column, line 10, claim 8, for "sahft" read --shaft--; line 66, claim 12, for the syllable "car" read --carried by--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.